No. 886,520. PATENTED MAY 5, 1908.
E. KOEB.
AUTOMOBILE.
APPLICATION FILED APR. 24, 1907.

Witnesses
G. Howard Walmsley,
Edward L. Reed.

Inventor
Emil Koeb,
By H. A. Toulmin,
Attorney

No. 886,520.

PATENTED MAY 5, 1908.

E. KOEB.
AUTOMOBILE.
APPLICATION FILED APR. 24, 1907.

UNITED STATES PATENT OFFICE.

EMIL KOEB, OF LEIPSIC, OHIO.

AUTOMOBILE.

No. 886,520.   Specification of Letters Patent.   Patented May 5, 1908.

Application filed April 24, 1907. Serial No. 369,919.

*To all whom it may concern:*

Be it known that I, EMIL KOEB, a citizen of the United States, residing at Leipsic, in the county of Putnam and State of Ohio, have invented certain new and useful Improvements in Automobiles, of which the following is a specification, reference being had therein to the accompanying drawings.

The present invention relates to automobiles, and more particularly to steering trucks adapted to carry driving mechanism.

The object of the present invention is to provide an improved truck of this character in which the axle shall be provided with means for supporting the driving mechanism and shall be so connected to the automobile as to permit of the axle moving about both a vertical axis to permit of the steering of the machine, and a transverse, horizontal axis to permit the opposite ends of the axle to occupy different horizontal planes without affecting the position of the main frame of the machine, thereby allowing the truck to adjust itself to inequalities of the roadway; to provide an improved means for connecting the spring or springs, which are interposed between the main frame of the machine and the axle, to the axle, whereby the axle is permitted to rock or rotate about its longitudinal axis without affecting the position of the spring or springs and without imposing torsional strain thereon; and further, to improve the general organization, as well as the detail construction, of the truck and thereby secure a more perfect operation and a better control of the same.

With these objects in view my invention consists of certain novel features of construction and organization to be hereinafter described, and then more fully pointed out in the claims.

In the accompanying drawings.

In these drawings, I have illustrated my invention as embodied in a motor car designed for transporting freight and heavy merchandise, but it is obvious that the same could be readily adapted to motor cars of almost any description. As herein shown, the reference numeral 1 indicates the main frame of the motor car which is provided near its forward end with an axle 2, provided at its outer ends with the usual ground wheels 3, which, in turn, are provided on their inner faces with suitable sprocket wheels 4. These sprocket wheels are rigidly secured to the ground wheels in any suitable manner, but I prefer the form herein shown, in which the inner face of the wheel is provided with an inwardly extending ring or drum 5 which is rigidly secured at one edge to the face of the wheel and at its opposite or inner edge to the sprocket wheel 4, preferably by means of bolts $5^a$ extending through the drum, through the sprocket wheel at one edge of the drum and through the spokes of the ground wheel at the other edge. This drum or ring, in addition to serving as a connection between the sprocket wheel and the ground wheel, may also be utilized as a brake drum, to which a suitable brake band may be applied. The main frame 1 is supported on the axle 2 by means of a spring or springs of suitable construction, those herein shown consisting of two semielliptical leaf springs 6, located one on each side of the axle and connected at their outer extremities to the axle. This connection is preferably a movable one, which may be formed in any suitable manner, that herein shown consisting in providing the springs near their opposite ends with bearing sleeves 7, in which is mounted a bolt or shaft 8 extending beyond the outer ends of the bearing sleeves and through the apertured lower ends of the links 9, suitable means, such as the nut 10, being provided to retain the several parts in their relative positions. The upper ends of the links 9 are pivotally mounted on a bolt 11 extending through a part carried by the axle, thus allowing the outer ends of the springs a longitudinal movement relatively to the axle. I also prefer to so connect the ends of the springs 6 to the axle 2 that this axle may have a rocking or rotary movement about its longitudinal axis without altering the position of the springs or imposing torsional strain thereon. To accomplish this a two part bearing block 12 is mounted near each end of the axle.

The bearing block is preferably provided with a sleeve 12ª, extending inwardly therefrom and rigidly secured to the axle to prevent the same moving longitudinally thereof. The bearing block and sleeve are preferably divided in a horizontal plane and are secured to the axle in any suitable manner. As here shown, the sleeve portion is secured to the axle by means of suitable bolts 33 in the manner hereinafter described. The bearing block 12 is provided with a circumferential bearing surface, preferably having outwardly extending flanges at each side thereof. A split bearing ring 13 is rotatably mounted upon the bearing surface of the bearing block 12 and is held against lateral movement thereon by means of the flanges. This bearing ring is preferably divided on a vertical plane, as shown, and is provided at each point of division with lugs 14, adapted to receive the bolts 11 and 11ª which serve to secure the ring about the bearing block, and thus secure the block on the axle, and, at the same time, adjust the bearing ring relatively to the bearing surface of the block to allow the same a rotary movement relatively thereto, while the upper bolt 11 also forms a support for the end of the spring 6 as described. The parts forming the connection between the springs and the axle are necessarily of a strong, heavy construction as they support the entire weight of the forward end of the main frame. The springs 6 may be secured to the main frame in any suitable manner, but I prefer that herein shown, in which each of the springs 6 is provided with an apertured lug 15 mounted on a suitable plate 16 which is secured to the center of the spring by means of a clip 17 extending about the same and secured to the plate 16. A second apertured lug 18 extends between the lugs 15, in alinement therewith and is connected thereto by a suitable bolt or shaft 19 extending through the three lugs and secured therein by means of a nut 20.

The lug 18 is provided with a substantially horizontal plate or bearing disk 21 having a bearing surface on its upper face and has mounted near its center an upwardly extending pin or king bolt 22, adapted to extend through the central aperture 23 formed in a second bearing plate 24, similar in construction to the plate 21 and provided with a bearing surface on its lower face adapted to coöperate with the bearing surface of the plate 21. Suitable means, such as a nut 25, are provided for securing the king bolt in position and preventing the separation of the two bearing disks. If desired, the adjacent faces of the disks 21 and 24 may be provided with annular ball races 26 in which may be mounted antifriction balls 27. The upper disk 24 is connected to the main frame of the machine by any suitable means, that herein shown consisting of T-shaped beams or irons, the vertical web 28 of which is secured to the sides of the upper portion of the bearing disk 24 by means of suitable bolts or screws 29 and the upper transverse plate 30 of which is secured to the main frame, preferably by bolts 31 extending through the transverse member 30 and through the flanges of the side members of the main frame, thus rigidly securing the bearing disk 24 to the main frame.

A suitable auxiliary frame is provided for supporting the driving mechanism. This auxiliary frame may be of any suitable construction and dimensions, that herein shown consisting of a bar, such as an I-beam 32, bent into substantially U-shape and supported at its ends upon the axle 2, to which it is rigidly secured in any suitable manner. The ends of the auxiliary frame are here shown as supported on the sleeve 12ª, which is mounted on the axle, and secured thereto by means of bolts 33 which are arranged in pairs on the opposite sides of the end of the frame, one bolt of each pair extending on each side of the axle 2. The upper ends of each pair of bolts 33 are connected one to the other by means of a plate 34 which is secured to that side of the bolts adjacent to the end of the frame and forms a projecting part which extends over the lower flange of the I-beam. These plates are secured to the frame by means of bolts 35 extending through the plates of both pairs of bolts and through the web of the I-beam forming the frame. The lower ends of the bolts are provided with apertured cross bars 36, extending over the bolts and beneath the sleeve 12ª, and with nuts 37, whereby the bolts and the plates or projections carried thereby, are drawn downward to bring the projection into engagement with the flange of the I-beam and secure the same firmly and rigidly to the axle. The forward end of the auxiliary frame 32 is preferably resiliently connected to the forward end of the main frame by any suitable means, that which I prefer consisting of two pairs of spiral springs 38, one pair located on each side of the main frame, and having their upper ends connected thereto in any suitable manner, that herein shown consisting of a yoke or clip 39 extending over the forward portion of the main frame near the center of the transverse member thereof and provided at its lower ends with stud-shafts 40, on the outer ends of which are mounted oppositely extending arms 41, to the opposite ends of which are secured the upper ends of the springs 38. The lower ends of the springs are secured to the transverse member of the axle frame, preferably by means of apertured lugs 42 which are secured to the upper surface of the frame and carry pins or bolts 43 to which are secured the lower ends of the springs 38. The distance between the points at which the lower ends of the springs are connected to the auxiliary frame is preferably considerably greater than the distance between the points at which the upper ends of the springs are connected to the main frame.

The tension of the springs 38 is such as to permit the movement of the auxiliary frame relatively to the main frame through a limited space, thus permitting the truck to be steered, but the distance which the springs will permit the auxiliary frame to move is not sufficient for practical purposes in steering the car, and, in order to permit of a sufficient movement of the auxiliary frame, it is desirable that the yoke 39, which supports the upper end of the springs, should be capable of movement laterally of the main frame. This may be accomplished in any suitable manner, but, as here shown, I have provided the inner ends of the stud-shafts 40 with suitable rollers 54, which extend between the flanges of the I-beams forming the main frame and travel upon one of these flanges which forms a track or guideway therefor, thus permitting the auxiliary frame to be moved through any desired distance for steering the car. This arrangement, however, will, under certain conditions, cause the tipping of the main frame, due to the fact that the weight of the auxiliary frame, which carries the engine and driving parts, is shifted to one side of the main frame. In order to overcome this tendency it is desirable that the resilient support should be secured at a fixed point near the center of the main frame and this I have accomplished in the form of the device shown in Figs. 10 to 12, which is practically a reversal of the form of support hereinbefore described. As shown in these drawings, the upper ends of the springs 38 are secured to the main frame by means of pins 91 extending through suitable apertured blocks or lugs 92, which are secured to the transverse member of the main frame on opposite sides of the center thereof.

Figures 10, 11, 12:
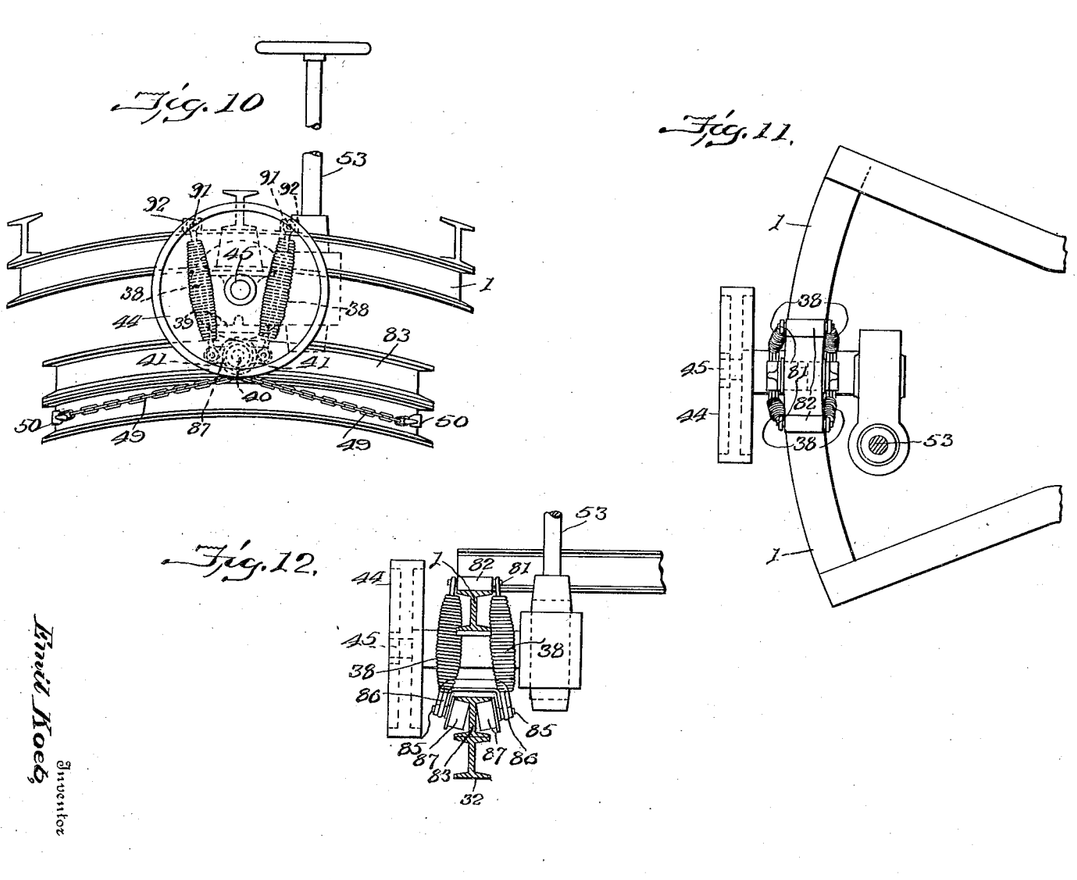
Fig. 10 is a front elevation of the two frames, showing a modified form of connecting device.
Fig. 11 is a top plan view of the same.
Fig. 12 is a sectional view of the same taken longitudinally of the main frame.

The auxiliary frame 32 is preferably provided with an upper or track member 83, which, as here shown, consists of an I-beam, similar to that of which the auxiliary frame is constructed, secured to the top of the transverse member of the auxiliary frame. A yoke 84, similar to that hereinbefore described, is mounted on the track member 83 and is provided at its lower ends with stud-shafts 85 carrying on their outer ends the oppositely extending arms 86, to which the lower ends of the resilient members 38 are secured. The shafts 85 are provided on their inner ends with rollers 87 adapted to engage between the flanges of the track member 83, the upper flange of which forms a track upon which the rollers travel. Thus, it will be seen that the auxiliary frame moves laterally of the main frame without shifting the point of support on the main frame, and, inasmuch as the auxiliary frame is rigidly secured at one end to the axle, the fact that the point of connection for the auxiliary frame is shifted does not serve to cause the same to tilt. It is usually desirable to apply the power for steering the truck at a point near the forward end of the auxiliary frame and I have here shown means for so applying power.

Any suitable steering means may be used, but I prefer that here shown, which consists of a segment or broken wheel 44, mounted upon one end of a shaft 45 which is journaled in a bearing 46 carried on a transverse bar 47 forming part of the main frame. This wheel has its periphery channeled, as shown at 48, and has secured to each side thereof one end of a chain 49, the opposite end of which extends around the lower surface of the wheel or segment and is secured to the auxiliary frame at a point near the side thereof opposite that side of the wheel or segment to which the upper end of the chain is connected, as shown at 50. Thus, it will be seen that the chain which is connected at one end to the right hand side of the segment is connected at its opposite end to the left hand side of the auxiliary frame and that the chain which is connected to the left hand side of the segment is connected at its opposite end to the right hand side of the auxiliary frame. Thus, when the segment is turned about its pivotal center, one of the chains is wound about the surface of the segment and the side of the auxiliary frame to which its outer end is connected is drawn toward the center of the main frame, thereby turning the axle about its vertical axis. The segment may be operated by any suitable means, such as the worm wheel 51 mounted on the end of the shaft 45 opposite that to which the segment is secured and a worm 52 mounted upon the member 47 of the frame and provided with a suitable shaft 53 and means for actuating the same.

In the modified form shown in Figs. 10 to 12, the steering mechanism is supported from the transverse member of the main frame instead of from an auxiliary bar extending between the sides of said frame, and the steering wheel 44 is located at the front of the car, as here shown. Otherwise, the steering mechanism shown in the modified form of device is similar to that hereinbefore described. As stated, this auxiliary frame is designed to support the driving mechanism comprising the engine, engine shaft, countershaft and the transmission gear for connecting the engine shaft to the countershaft. To this end the frame is preferably provided with a longitudinal member or beam 55 mounted at one side of the center thereof and secured at its forward end to the transverse member of the frame and secured at its rear end beneath the axle 2 by means of clips 56 extending about the axle, a cross bar 57 extending between the lower end of the clips, and suitable nuts 58 for securing the cross bar to the clips. The longitudinal member 55 is connected with one side of the auxiliary frame by means of a transverse member 59 which preferably has its central portion depressed to form a support for the rear end of the engine cylinder 60, the forward end of which is secured to the forward end of the auxiliary frame. The crank shaft of the engine is journaled in suitable bearings 61 mounted on the auxiliary frame and the countershaft 62 is mounted in similar bearings located in the rear of the bearings supporting the crank shaft. The countershaft is provided with a suitable compensating gearing which is embodied in the transmission gearing 64. The outer ends of the countershaft 62 are provided with sprocket pinions 65 which are connected by suitable driving chains with the sprocket wheels 4 secured to the ground wheels of the truck. Suitable gear casings 66 extend over the sprocket wheels and the chain and may be of any desired construction.

Figure 1:
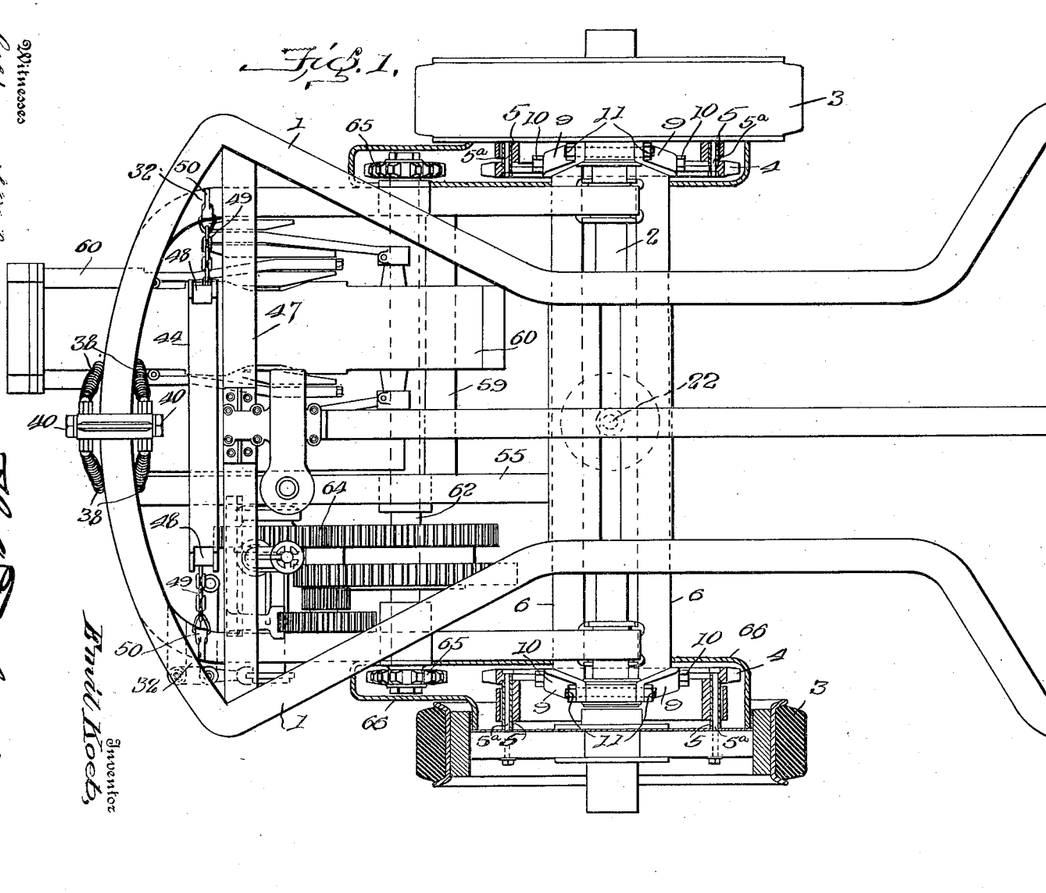
Figure 1 is a top plan view of the forward portion of a motor car embodying my invention.
Figure 2:
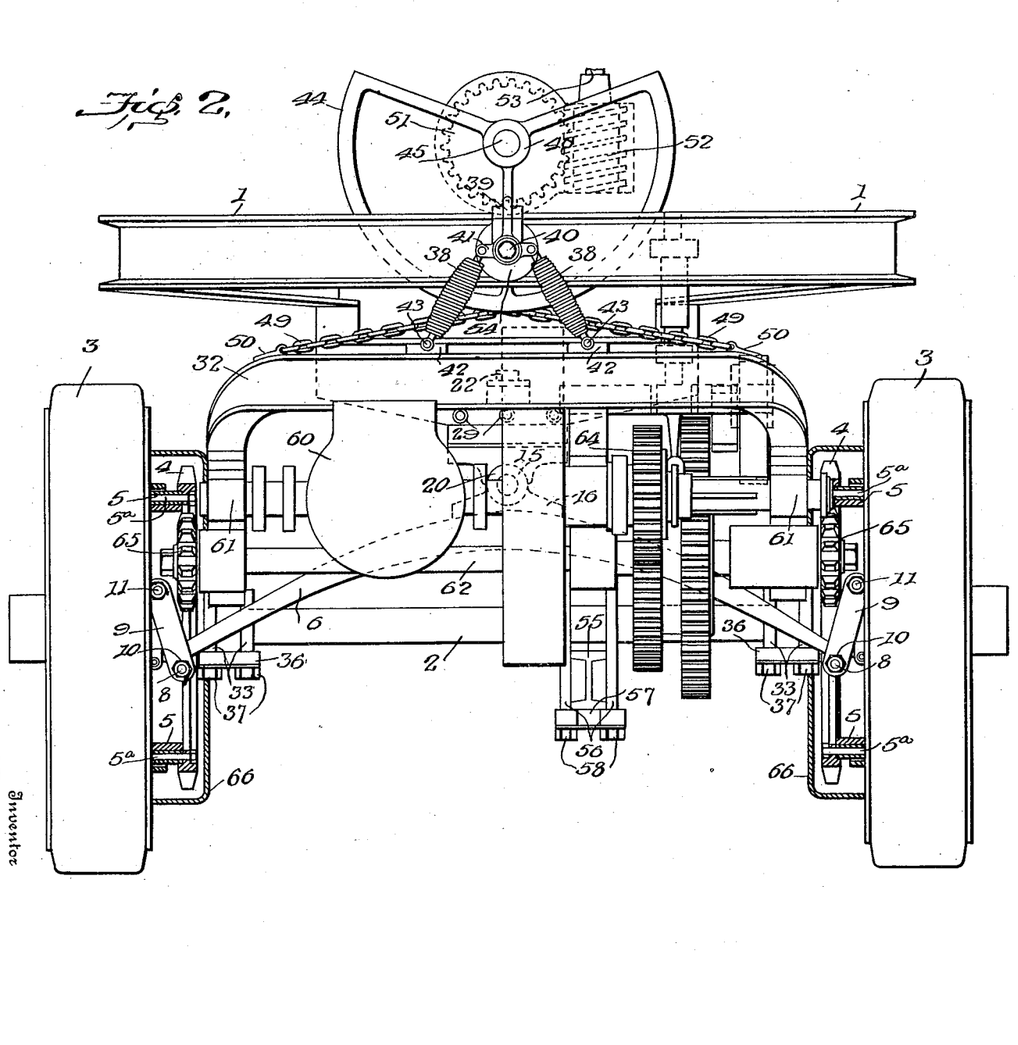
Fig. 2 is a front elevation of the same.
Figure 3:
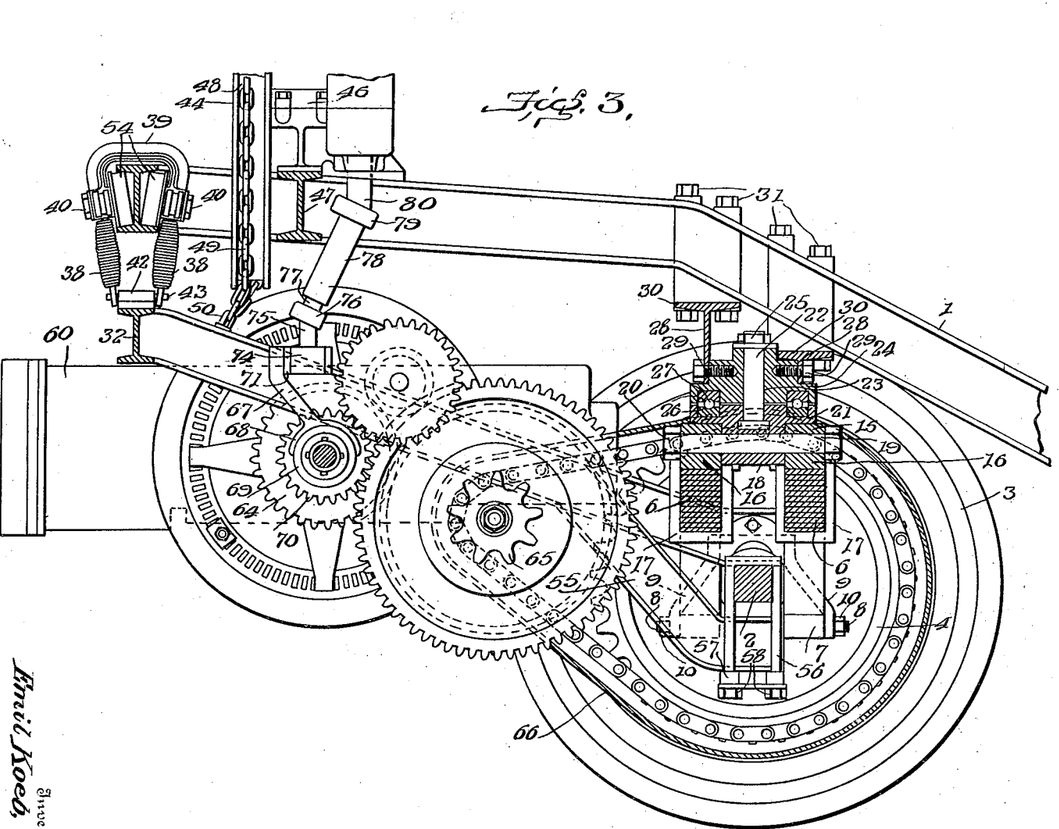
Fig. 3 is a longitudinal, vertical section taken centrally through the same.
Figure 4:
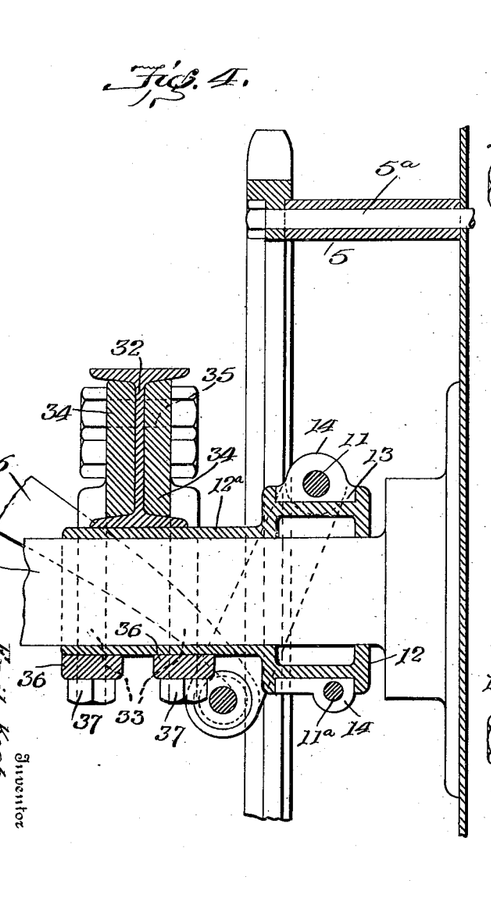
Fig. 4 is a vertical sectional view, taken through the spring support on the axle.
Figure 5:
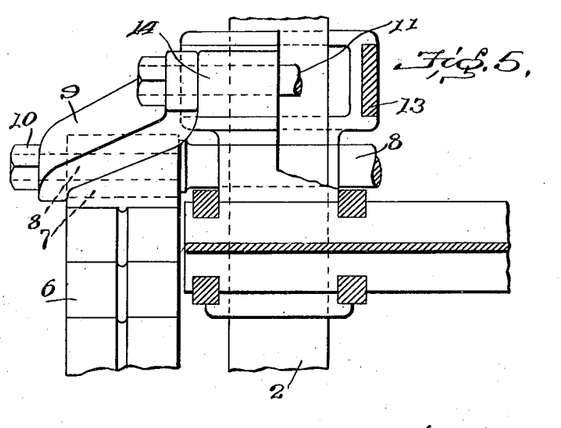
Fig. 5 is a top plan view of the same partially broken away.
Figure 6:
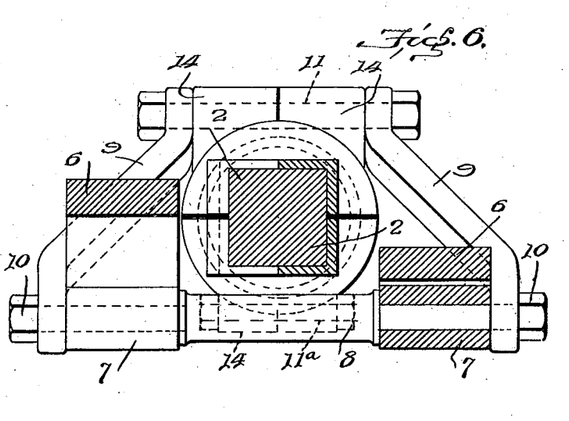
Fig. 6 is a transverse sectional view thereof.
Figures 7, 8, 9:
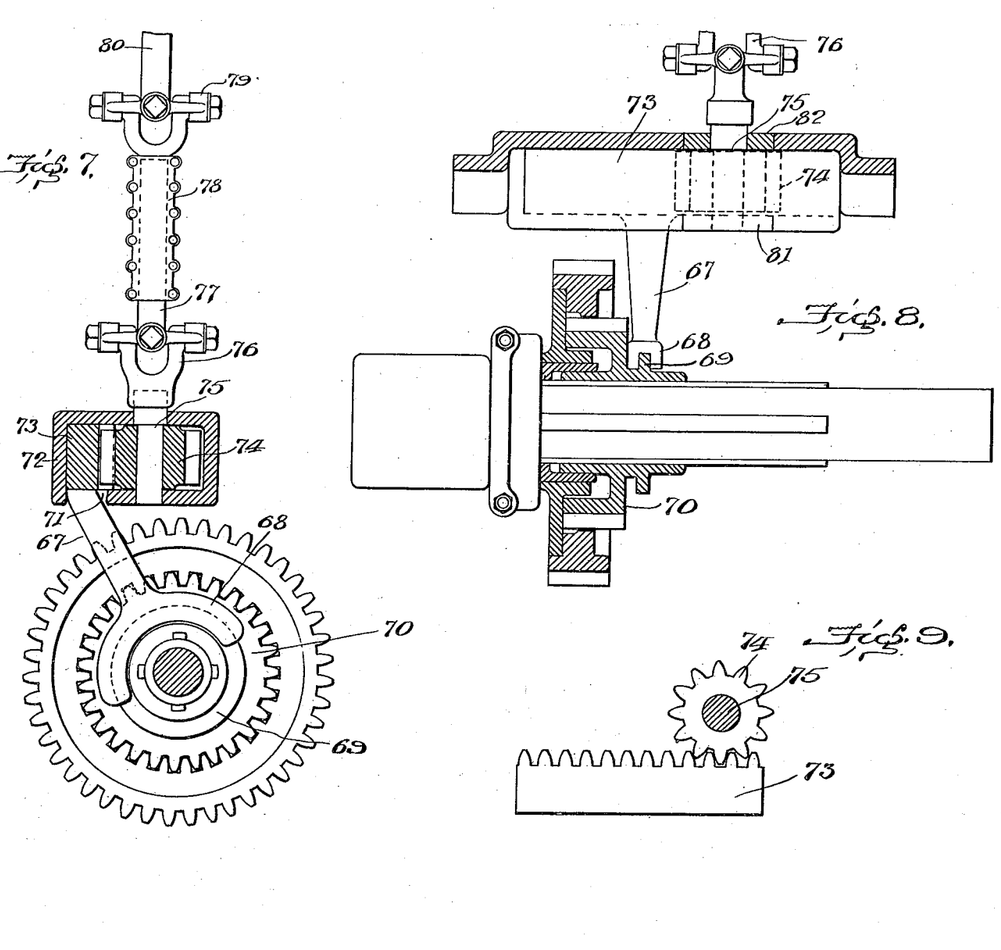
Fig. 7 is a detail view showing the operating mechanism for the transmission gearing, partly in section and partly in elevation.
Fig. 8 is a transverse sectional view of the same, partly in section.
Fig. 9 is a detail plan view of the rack and pinion.

Suitable mechanism is provided for operating the transmission gearing, which preferably consists of an arm 67 connected at one end to the transmission gear in any suitable manner, as by means of a bifurcated yoke 68, adapted to engage a flange or collar 69, secured to the slidable gear 70 of the transmission gearing. The upper end of this arm extends through a slot 71 in the lower side of the casing 72, in which is slidably mounted a rack 73, to which the upper end of the arm 67 is rigidly secured. A pinion 74 is also mounted in the casing 72 and meshes with the rack 73. The operating shaft 75 of the pinion 74 extends through the upper side of the casing and is connected by means of a universal joint 76 with a rod 77 which is slidably mounted in a sleeve 78, which, in turn, is connected by means of a second universal joint 79 with an operating handle 80, which extends above the main frame to a point within reach of the operator. The rod 77 and sleeve 78 are preferably non-circular in cross section, or are provided with other suitable means for allowing the same to move longitudinally, but to prevent rotation of the same relatively one to the other. Thus, it will be seen that the auxiliary frame 32 may move freely relatively to the main frame both vertically and transversely thereto. The telescoping connection formed by the sleeve 78 and the rod 77 permits a free vertical movement, while the telescoping connection, in combination with the two universal joints 76 and 79, permits of the lateral movement of the casing, which is secured to the auxiliary frame, without affecting the operativeness of the mechanism. If desired, the operating shaft 75 of the pinion 74 may be extended through both walls of the casing, and the openings through which the ends of the shaft extend may be slightly elongated, as shown at 81 and 82, thus permitting the pinion to have a slight longitudinal movement within the casing 72.

From the foregoing description it will be observed that I have provided a forward steering truck for a motor car, upon which is mounted the driving mechanism, and which is so connected with the main frame of the car that the truck can be moved about a vertical axis to steer the same; that the axle and the parts carried thereby can be moved about a transverse horizontal axis to permit the opposite ends of the axle to occupy a different horizontal plane, thus allowing the truck to accommodate itself to the irregularities of the roadway without altering the position of the main frame; that I have so connected the springs, which are interposed between the main frame and the truck, to the axle as to permit the axle to be rocked or rotated about its longitudinal axis without altering the position of the springs and without imposing torsional strain thereon; further, that I have provided novel means for supporting the front end of the auxiliary frame in its proper relation relatively to the main frame and have provided novel means for moving the auxiliary frame transversely of the main frame to steer the car; further, that I have provided a truck of this character of an improved organization, as well as an improved detail construction, whereby the operation is greatly improved, and whereby the truck is capable of being turned in a very small space, and in which the springs are so mounted and arranged as to take all torsional strain from the engine and the driving mechanism; and further, that all the driving mechanism can readily be incased to prevent the entrance of dust thereto.

I wish it to be understood that I do not desire to be limited to the exact details of construction shown and described, for obvious modifications will occur to a person skilled in the art.

Having thus fully described my invention, what I claim as new and desire to secure by Letters Patent, is:—

1. In an automobile, the combination, with the main frame, an axle pivotally connected thereto, and ground wheels carried by said axle, of an auxiliary frame secured to said axle and having one end adapted to move in a vertical plane, driving mechanism carried by said auxiliary frame, and means for operatively connecting said driving mechanism to said ground wheels.

2. In an automobile, the combination, with a main frame, an axle pivotally connected thereto and adapted to move about a vertical and a horizontal axis, and ground wheels carried by said axle, of an auxiliary frame secured at one end to said axle and connected at the other end to said main frame, driving mechanism carried by said auxiliary frame, and means for operatively connecting said driving mechanism to said ground wheels.

3. In an automobile, the combination, with a main frame, an axle pivotally connected thereto and adapted to move about both a vertical and a longitudinal horizontal axis, and ground wheels carried by said axle, of an auxiliary frame secured to said axle, driving mechanism carried by said auxiliary frame, and means for operatively connecting said driving mechanism to said ground wheels.

4. In an automobile, the combination, with a main frame, an axle pivotally connected thereto and adapted to move about a vertical axis and both transverse and longitudinal horizontal axes, and ground wheels carried by said axle, of driving mechanism supported from said axle, and means for operatively connecting said driving mechanism to said ground wheels.

5. In an automobile, the combination, with a main frame, an axle pivotally connected thereto, and ground wheels mounted on said axle, of an auxiliary frame secured at one end to said axle, resilient means for connecting the opposite end of said auxiliary frame to said main frame, driving mechanism carried by said auxiliary frame, and means for operatively connecting said driving mechanism to said ground wheels.

6. In an automobile, the combination, with a main frame, an axle pivotally connected thereto, and ground wheels mounted on said axle, of an auxiliary frame secured at one end to said axle, a spring connecting the other end of said auxiliary frame to said main frame, driving mechanism carried by said auxiliary frame, and means for operatively connecting said driving mechanism to said ground wheels.

7. In an automobile, the combination, with a main frame, an axle pivotally connected thereto, and ground wheels mounted on said axle, of an auxiliary frame secured at one end to said axle, a plurality of resilient members connecting the other end of said auxiliary frame to said main frame and arranged to act both laterally and vertically upon said auxiliary frame, driving mechanism carried by said auxiliary frame, and means for operatively connecting said driving mechanism to said ground wheels.

8. In an automobile, the combination, with a main frame, an axle pivotally connected thereto, and ground wheels mounted on said axle, of an auxiliary frame secured at one end to said axle, a plurality of resilient members secured at their lower ends to said auxiliary frame and at their upper ends to said main frame, the distance between the points of connection of the lower ends of said resilient members to said auxiliary frame being greater than the distance between the points of connection of said resilient members to said main frame, driving mechanism carried by said auxiliary frame, and means for operatively connecting said driving mechanism to said ground wheels.

9. In an automobile, the combination, with a main frame, an axle pivotally connected thereto, and ground wheels mounted on said axle, of an auxiliary frame extending longitudinally of said main frame and connected at one end to said axle, means connecting the other end of said auxiliary frame to said main frame, means independent of said connecting means for moving said auxiliary frame relatively to said main frame, driving mechanism carried by said auxiliary frame, and means for operatively connecting said driving mechanism to said ground wheels.

10. In an automobile, the combination, with a main frame, an axle pivotally connected thereto, and ground wheels mounted on said axle, of an auxiliary frame extending longitudinally of said main frame and connected at one end to said axle, resilient means for connecting the opposite end thereof to said main frame, means connected to said opposite end of said auxiliary frame for moving the same transversely of said main frame, thereby turning said axle, driving mechanism carried by said auxiliary frame, and means for operatively connecting said driving mechanism to said ground wheels.

11. In an automobile, the combination, with a main frame, an axle pivotally connected thereto, and ground wheels mounted on said axle, of an auxiliary frame extending longitudinally of said main frame and secured at one end to said axle, a segment supported from said main frame, chains each connected at one end to one side of said segment and at the other end to the opposite side of said auxiliary frame, means for rotating said segment about its pivotal center, driving mechanism carried by said auxiliary frame, and means for operatively connecting said driving mechanism to said ground wheels.

12. In an automobile, the combination, with a main frame, an axle, ground wheels mounted thereon, a spring connected near its ends to said axle and pivotally connected between its ends to said main frame, of driving mechanism supported from said axle, and means for operatively connecting said driving mechanism to said ground wheels.

13. In an automobile, the combination, with a main frame, an axle, ground wheels mounted thereon, a spring connected near its ends to said axle, a vertically extending king bolt secured to said spring between its ends and journaled in a bearing secured to said main frame, of a driving mechanism supported from said axle, and means for operatively connecting said driving mechanism to said ground wheels.

14. In an automobile, the combination, with a main frame, an axle, ground wheels mounted thereon, a spring connected near its ends to said axle, a bearing plate secured to said spring between its ends, a second bearing plate coöperating with said first-mentioned bearing plate and secured to said main frame, means for securing said bearing plates in operative relation one to the other, driving mechanism supported from said axle, and means for operatively connecting said driving mechanism to said ground wheels.

15. In an automobile, the combination, with a main frame, an axle, ground wheels mounted thereon, a spring connected near its ends to said axle, a bearing plate pivotally connected to said spring between its ends, a second bearing plate coöperating with said first-mentioned bearing plate and secured to said main frame, and means for securing said bearing plates in operative relation one to the other, of driving mechanism supported from said axle, and means for operatively connecting said driving mechanism to said ground wheels.

16. In an automobile, the combination, with a main frame, an axle, ground wheels mounted on said axle, springs mounted one on either side of said axle and connected thereto near their ends, an apertured lug secured to each of said springs between its ends, an apertured lug between said first-mentioned apertured lugs and having a bearing plate formed thereon, a bolt pivotally connecting said last-mentioned apertured lug to said first-mentioned apertured lugs, a second bearing plate coöperating with said first-mentioned bearing plate and connected to said main frame, and means for securing said bearing plates in operative relation one to the other, of driving mechanism supported from said axle, and means for operatively connecting said driving mechanism to said ground wheels.

17. In an automobile, the combination, with a main frame, an axle, ground wheels mounted on said axle, a spring secured to said main frame between its ends, and means for loosely connecting the ends of said spring to said axle, whereby said axle can rotate about its longitudinal axis independently of said spring, of driving mechanism supported from said axle, and means for operatively connecting said driving mechanism to said ground wheels.

18. In an automobile, the combination, with a main frame, an axle, ground wheels mounted on said axle, a plurality of springs located one on each side of said axle and pivotally connected between their ends to said main frame, and means for loosely connecting said springs near their ends to said axle, whereby said axle is free to move about its longitudinal axis independently of said springs, of driving mechanism supported from said axle, and means for operatively connecting said driving mechanism to said ground wheels.

19. In an automobile, the combination, with a main frame, an axle, ground wheels mounted on said axle, springs connected to said main frame at a point between their ends, a bearing block journaled on each end of said axle, and means for connecting the ends of said springs to their respective bearing blocks, of driving mechanism supported from said axle, and means for operatively connecting said driving mechanism to said ground wheels.

20. In an automobile, the combination, with a main frame, an axle, and ground wheels mounted on said axle, of springs connected between their ends to said main frame, a two part bearing block mounted at each end of said axle, a split collar extending about said bearing block, a bolt connecting the ends of said split collar, a link connecting the adjacent ends of said springs to said bolt, driving mechanism mounted on said axle, and means for operatively connecting said driving mechanism to said ground wheels.

21. In an automobile, the combination, with a main frame, an axle, and ground wheels mounted on said axle, of springs connected to said main frame at a point between their ends, a bearing block journaled near each end of said axle, means for connecting the ends of said springs to said bearing block, an auxiliary frame secured to said axle, driving mechanism mounted on said auxiliary frame, and means for operatively connecting said driving mechanism to said ground wheels.

22. In an automobile, the combination, with a main frame, an axle pivotally connected thereto, and ground wheels mounted on said axle, of an auxiliary frame comprising a flanged beam supported at one end on said axle, a clip having a projection at its upper end adapted to engage the flange of said beam and extending on either side of said axle, means for securing said clip to said axle, driving mechanism mounted on said auxiliary frame, and means for operatively connecting said driving mechanism to said ground wheels.

23. In an automobile, the combination, with a main frame, an axle pivotally connected thereto, and ground wheels carried by said axle, of an auxiliary frame comprising an I-beam bent into a substantially U-shape and supported at its ends on said axle, driving mechanism mounted on said auxiliary frame, and means for operatively connecting said driving mechanism to said ground wheels.

24. In an automobile, the combination, with a main frame, an axle pivotally connected thereto, an auxiliary frame secured to said axle, and driving mechanism carried by said auxiliary frame, of ground wheels mounted on said axle, an inwardly extending drum secured to the spokes of each of said ground wheels, a sprocket wheel secured to the inner end of said drum, and means for operatively connecting said sprocket wheel to said driving mechanism.

25. In an automobile, the combination, with a main frame, an axle pivotally connected thereto, and ground wheels mounted on said axle, of an auxiliary frame secured at one end to said axle, resilient means for connecting the opposite end of said auxiliary frame to said main frame, steering mechanism adapted to move said axle and the auxiliary frame carried thereby about its pivotal center, driving mechanism carried by said auxiliary frame, and means for operatively connecting said driving mechanism to said ground wheels.

26. In an automobile, the combination, with a main frame, an axle pivotally connected thereto, and ground wheels mounted on said axle, of an auxiliary frame secured at one end to said axle, means for connecting the forward ends of said main frame and said auxiliary frame, said connecting means being secured at a fixed point on one of said members and movably connected to the other of said members, means independent of said connecting means for moving said auxiliary frame relatively to said main frame, driving mechanism carried by said auxiliary frame, and means for operatively connecting said driving mechanism to said ground wheels.

27. In an automobile, the combination, with a main frame, an axle pivotally connected thereto, and ground wheels mounted on said axle, of an auxiliary frame secured at one end to said axle, a resilient member connecting the other end of said auxiliary frame to said main frame, said resilient member being secured at a fixed point on one of said frames and movably connected to the other of said frames, driving mechanism carried by said auxiliary frame, and means for operatively connecting said driving mechanism to said ground wheels.

28. In an automobile, the combination, with a main frame, an axle pivotally connected thereto, and ground wheels mounted on said axle, of an auxiliary frame secured at one end to said axle, means for connecting said auxiliary frame to said main frame, said connecting means being secured at one end to a fixed point on one of said frames, rollers secured at the opposite ends of said connecting means, a guideway carried by the other of said frames and adapted to be engaged by said rollers, driving mechanism carried by said auxiliary frame, and means for operatively connecting said driving mechanism to said ground wheels.

29. In an automobile, the combination, with a main frame, and an auxiliary frame, of means for connecting said frames comprising a transverse guideway carried by one of said frames, a roller adapted to engage said guideway, a connecting member secured at one end to said roller and at the other end to a fixed point on the other frame.

30. In an automobile, the combination, with a main frame and an auxiliary frame, one of said frames comprising an I-beam, of means for connecting said frames comprising a yoke extending over said I-beam and having its ends on the opposite side thereof, rollers carried by the ends of said yoke, connecting members secured at one end to the opposite ends of said yoke and at the other end to a fixed point on the other frame.

31. In an automobile, the combination, with a main frame, and an auxiliary frame, one of said frames comprising an I-beam, of means for connecting said frames comprising a yoke extending about said I-beam and having its ends on the opposite side thereof, shafts journaled in the ends of said yoke, rollers mounted on the inner ends of said shafts and adapted to engage the flanges of said I-beam, arms secured to the outer ends of said shafts, resilient members secured at one end to one of said arms and at the other end to a fixed point on the other frame.

32. In an automobile, the combination, with a main frame, an axle pivotally connected thereto, and ground wheels mounted on said axle, of an auxiliary frame secured at one end to said axle, resilient members movably connected at their upper ends to said main frame and secured at their lower ends to a fixed point on said auxiliary frame, driving mechanism carried by said auxiliary frame, and means for operatively connecting said driving mechanism to said ground wheels.

33. In an automobile, the combination, with a main frame, an axle pivotally connected thereto, and ground wheels mounted on said axle, of an auxiliary frame secured at one end to said axle, a yoke extending over said main frame and having its ends on the opposite sides thereof, rollers carried by the ends of said yoke and traveling on said main frame, resilient members each connected at one end to said yoke and secured at the other end to a fixed point on said auxiliary frame, driving mechanism carried by said auxiliary frame, and means for operatively connecting said driving mechanism to said ground wheels.

In testimony whereof, I affix my signature in presence of two witnesses.

EMIL KOEB.

Witnesses:
 FRANCIS M. HAGAN, Jr.,
 HARRIET L. HAMMAKER.